(12) United States Patent
Fabrizi et al.

(10) Patent No.: US 8,091,096 B1
(45) Date of Patent: Jan. 3, 2012

(54) MINIMIZING PLUG-IN DLL REPEAT INSTANTIATION

(75) Inventors: Matthew D. Fabrizi, Penfield, NY (US); Alan K. Robertson, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 937 days.

(21) Appl. No.: 12/100,502

(22) Filed: Apr. 10, 2008

(51) Int. Cl.
*G06F 3/00* (2006.01)
(52) U.S. Cl. ....................................................... 719/331
(58) Field of Classification Search ........................ None
See application file for complete search history.

(56) References Cited

U.S. PATENT DOCUMENTS

| | | | | |
|---|---|---|---|---|
| 5,604,843 | A * | 2/1997 | Shaw et al. ..................... | 358/1.1 |
| 2003/0208520 | A1 * | 11/2003 | Hewitt .......................... | 709/102 |
| 2005/0144590 | A1 * | 6/2005 | Limprecht et al. ............ | 717/120 |

* cited by examiner

*Primary Examiner* — H. S. Sough
*Assistant Examiner* — Carina Yun
(74) *Attorney, Agent, or Firm* — Philip E. Blair; Fleit Gibbons Gutman Bongini & Bianco P.L.

(57) ABSTRACT

What is disclosed is a novel system and method for ensuring that plug-in DLLs are not unloaded and reloaded repeatedly during the course of a single user-initiated operation. A base driver process loads a plug-in DLL. If a manager thread responsible for this plug-in does not exist then a reference count for the plug-in DLL is incremented. Incrementing the system reference count ensures that the plug-in DLL remains loaded between base driver calls for all of the user-initiated operation by preventing the operating system from unloading the plug-in DLL. A manager thread is then created. The manager thread monitors active COM objects and checks if the base driver is still in memory. If no COM objects are found to be in use after a predetermined amount of time or if the base driver is no longer loaded in memory, the system reference count is decremented. The manager thread then exits.

12 Claims, 3 Drawing Sheets

MINIMIZING PLUG-IN DLL REPEAT INSTANTIATION

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights.

TECHNICAL FIELD

The present invention is directed to systems and methods for ensuring that a plug-in DLL is not repeatedly unloaded and reloaded multiple times during the course of a single user-initiated operation.

BACKGROUND

Many Windows® print drivers utilizing a plug-in customization architecture (commonly referred to as "mini-drivers") by the Microsoft Corporation are repeatedly loaded and unloaded from memory by base drivers such as, for example, Unidrv and Pscript, hundreds or perhaps even thousands of times during the course of a single print operation to handle various events and callbacks commonly known in the software arts. This has caused performance degradation problems as the driver's DLLs (Dynamic Linked Libraries) grow in size, number, and complexity of driver features. Repeatedly loading and unloading feature rich drivers can degrade performance in those systems where memory and processor speed may be limited by hardware constraints.

Customers utilizing printing systems often complain about print driver performance and, more particularly, about the time it can take to display, for instance, a Printer Properties User Interface (PPUI), switch a print driver in an application, and display a Document Properties Interface (DPI) in any single application. One reason for this time delay can be the number of times the plug-in DLLs are loaded and unloaded from memory. Plug-in DLLs may be loaded and unloaded from memory over one hundred times simply to display a PPUI because DLLs are read, address tables created, and in many instances global data including some complex C++ objects must be initialized.

Previous methods utilized various algorithmic optimization techniques to increase performance. For example, relatively simple C-language DLLs (not C++ DLLs exporting classes) were loaded and unloaded through a manual process in certain key event handlers and callbacks in order to address performance degradation issues. In addition, the Microsoft compiler and linker technology, often referred to as "Delay-Loading", has been adapted for use with the plug-in DLL in an effort to eliminate loading of dependent DLLs when the code they contain is not required during that loaded instance.

Accordingly, what is needed in this art are increasingly sophisticated systems and methods for ensuring that a plug-in DLL is not repeatedly loaded and unloaded during the course of a single user-initiated operation in order to enhance system performance.

BRIEF SUMMARY

What is provided is a novel system, method, and computer program product for ensuring that plug-in DLLs are not unloaded and reloaded many times during the course of a user-initiated operation. The present method solves the problem caused by repeated unloading/reloading of plug-in DLLs through a novel implementation of an intelligent driver supervisor which coordinates plug-in DLL instantiation. A manager thread, separate from the base driver thread, is created. The manager thread ensures that a plug-in DLL is not unloaded and reloaded multiple times during the course of a single user initiated operation. The plug-in DLL is removed only when the base driver itself is unloaded or if no COM objects associated by the plug-in DLL have been found to be active after a predetermined amount of time. In such a manner, repeat instantiation of the plug-in DLL is minimized resulting in increased system performance and enhanced customer satisfaction.

In one example embodiment, the present method for minimizing loading and unloading of a plug-in DLL involves a user-initiating an operation which instantiates a base driver process. The base driver in turn loads a plug-in DLL and requests that the plug-in DLL construct a first COM object. A determination is made by the plug-in DLL whether a manager thread responsible for the plug-in DLL already exists. If the manager thread does not exist a reference count for the plug-in DLL is incremented. The reference count is used by the operating system to track that this plug-in is loaded in memory. Incrementing the system reference count ensures that the plug-in DLL remains loaded between base driver calls for all of the user-initiated operation by preventing the operating system from unloading the plug-in. A manager thread is created and associated with the plug-in DLL. The manager thread monitors active COM objects and monitors the base driver in memory. If no COM objects are found to be in use after a predetermined amount of time or if the base driver is no longer loaded in memory, the system reference count is decremented. Decrementing the system reference count causes the system to unload the plug-in from memory. The manager thread then exits. Other features are provided.

The foregoing and other features and advantages will be apparent from the following more particular description of the preferred embodiments of the invention, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided are a system and method for ensuring that a plug-in DLL is not unloaded and reloaded many times during a single user-initiated operation. The present method solves the previously discussed problem caused by repeated instantiation of a plug-in DLL through the implementation of a manager thread which monitors active COM objects and the base driver in memory and ensures that the plug-DLL is not unloaded from memory during a user initiated operation.

It should be understood that one of ordinary skill in this art would be readily familiar with many facets of drivers, APIs, and DLLs and other related techniques and algorithms commonly found in this art. One of ordinary skill in this art would also be knowledgeable about computer science and software and programming sufficient to implement the functionality and capabilities described in detail herein in their own hardware environments without undue experimentation.

Figure 1:
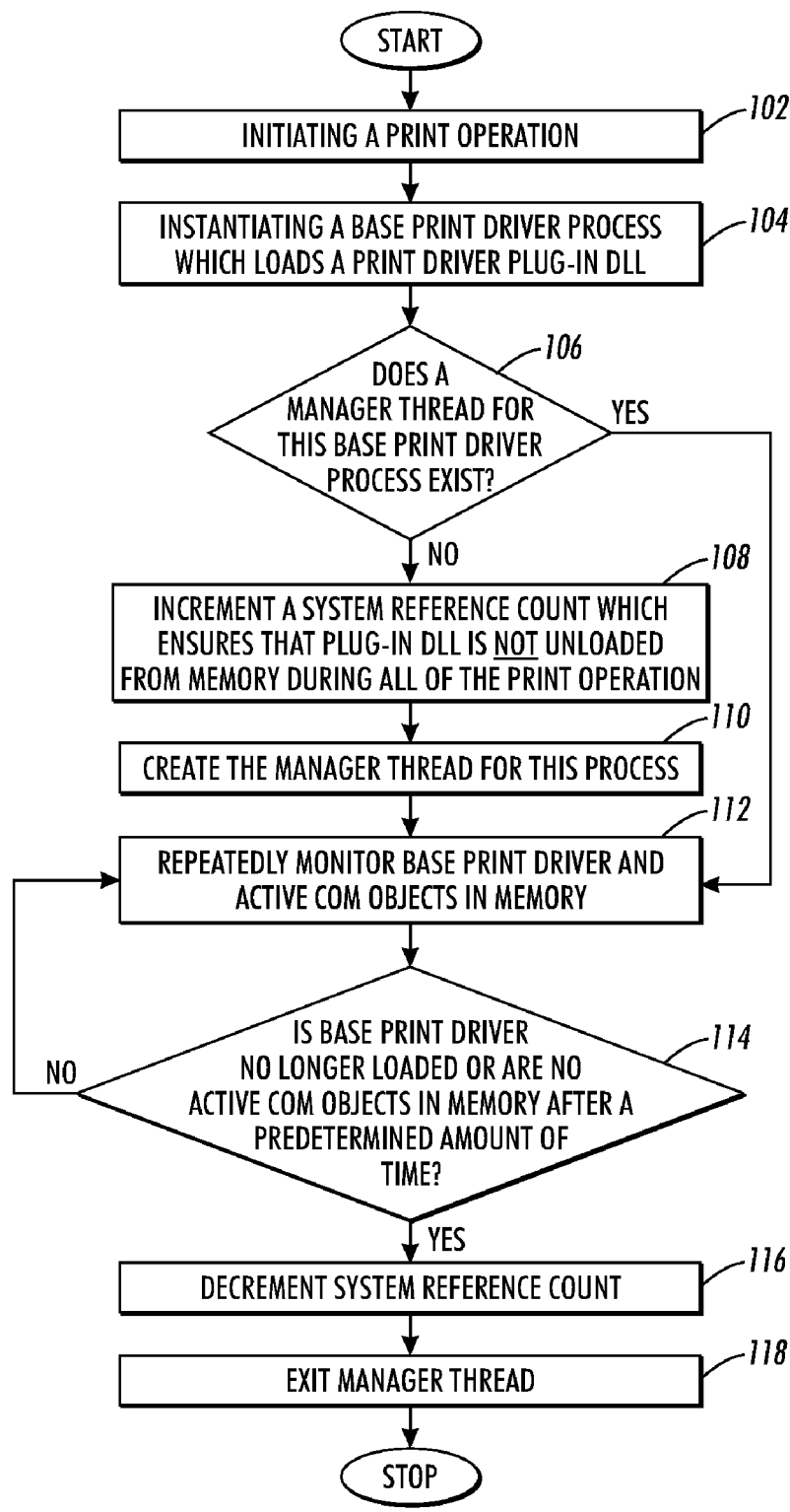
FIG. 1 is a flow diagram of one embodiment of the present method for ensuring that plug-in DLLs are not repeatedly unloaded and reloaded during the course of a single user-initiated print operation.

Reference is now being made to FIG. 1 illustrating a flow diagram of one embodiment of the present method for ensuring that plug-in DLLs are not repeatedly loaded/unloaded from memory during the course of a single user-initiated operation. Although the discussion herein is given with respect to a base print driver loading a plug-in DLL in the context of a user initiated print operation, it should be understood that the present method is equally applicable to an OS environment capable of spawning separate process threads.

In one embodiment, the present method for minimizing loading and unloading of a plug-in DLL involves, at step 102, a user-initiating a print operation. At step 104, a base print driver process is instantiated in response to the user-initiated print operation. The base print driver loads a print driver plug-in DLL. At step 106, a determination is made whether a manager thread responsible for the print driver plug-in DLL already exists. If the manager thread does not exist then, at step 108, a system reference count associated with the plug-in is incremented. The reference count for the plug-in DLL is used by the operating system to track that the plug-in has been loaded. Incrementing the system reference count ensures that the plug-in DLL remains loaded between base driver calls for all of the user-initiated operation by preventing the operating system from unloading the print driver plug-in. At step 110, the manager thread is created. At step 112, the manager thread monitors active COM objects spawned by the plug-in DLL and monitors whether the base print driver is still loaded. At step 114, if no COM objects are found to be still active in memory after a predetermined amount of time or if the base print driver is no longer loaded in memory then the system reference count is decremented at 116. Decrementing the reference count causes the system to unload the plug-in from memory. At step 118, the manager thread exits.

Although the present method is discussed with respect to the Windows architecture, it should also be understood that the teachings hereof are extendible to other operating systems which provide similar functionality and capabilities as described herein.

In general, a plug-in is a DLL that implements a specific Component Object Model (COM) interface defined by the base driver. When the base driver needs to interact with the plug-in DLL, the base driver loads the plug-in DLL and requests the plug-in DLL to construct and return one or more COM objects. Such interaction might be, for example, to notify the plug-in of an event; to request the plug-in to operate on some print driver data; or to request the plug-in to display a user interface (UI). The base driver interacts with the returned COM object(s) through fundamental COM interfaces. When the base driver completes the interaction with a COM object, it instructs the plug-in DLL to destroy the COM object returned earlier. The plug-in DLL is then freed.

In a Microsoft Windows architecture, the first time a component causes a DLL to be loaded, the Windows operating system makes the plug-in DLL available to the base process (e.g., reading it from disk, fixing up addresses to avoid overlaps with other DLLs, initializing entry point tables, etc.). It also sets the system "reference count" for the plug-in DLL to 1. The reference count is incremented to indicate that another component in the process is using the plug-in DLL. Subsequent attempts to load that same plug-in DLL don't require additional work because the DLL is already available. Only the reference count needs to be incremented. When a component in the process indicates that the plug-in DLL is no longer needed, the reference count is decremented. This is often referred to as "freeing" the DLL. When the reference count becomes zero, the operating system (OS) knows that the plug-in DLL is no longer needed and can be removed from the process' address space. A subsequent load of the plug-in DLL will require much of the original loading work to be performed again.

In order to keep the plug-in DLL from being unloaded when it is no longer in use, the present method calls, upon the construction of a first COM object, for the COM object constructor in the plug-in DLL to create a manager thread. This can be effectuated in the Windows architecture by a CreateThread API. The manager thread is responsible for ensuring that the plug-in DLL is not unloaded from memory during course of the user-initiated operation. The manager thread achieves this by incrementing the above-discussed system reference count. This particular operation can be effectuated in a Windows architecture via a LoadLibrary API. Then, even after the COM object is destroyed and the plug-in DLL freed, the reference count remains above zero and the plug-in DLL will not automatically be unloaded from memory by the operating system. The next time the base driver wants to use that same plug-in DLL, the plug-in DLL is already loaded.

The present method ensures that the plug-in DLL does not remain loaded forever by the manager thread freeing the plug-in DLL when it is determined that no COM objects have been in use for a predetermined amount of time, for example, 250 milliseconds. The manager thread tracks COM object construction and destruction requests. These are good indicators of when the plug-in DLL has just been loaded in memory and when it is about to be freed. This also avoids having to use the main DLL entry point to count attaches and detaches of various threads and processes.

The manager thread can be set to timeout and unload the plug-in DLL after a relatively short time (e.g., 250 ms). Because there may still be an unacceptable delay when a process is trying to exit and is waiting for all running threads to terminate, the timeout period should still be long enough to prevent the plug-in DLL from unloading too often but short enough that the DLL will be released from memory in a timely manner so as not to interfere with attempts to delete or upgrade the DLL.

The manager thread periodically checks to determine whether the base driver is still loaded in memory. This can be effectuated in the Windows architecture by a GetModuleHandle API. If it is determined that the base driver is no longer loaded in memory then the manager thread exits immediately without waiting for any remainder of the timeout period to expire. In practice, the base driver is not loaded and unloaded as frequently as the plug-in DLL. Therefore, terminating the plug-in DLL when the base driver is unloaded from memory does not defeat the savings of keeping the plug-in DLL loaded between COM object instantiations. The period between checks for the base driver being loaded are shorter than the timeout period but not so short that the manager thread starts to utilize too many CPU cycles by constant checking. One example timeout period is 50 ms. In such a manner, it is ensured that when the host process shuts down (or when the driver is being upgraded) and the base driver is unloaded that the plug-in DLL exits quickly.

Advantageously, later COM object interactions can be prepared for by the manager thread loading a utility DLL which can prepare resources needed by more involved/complicated COM object methods that typically occur later in the sequence of COM object creations. The manger thread is started and immediately begins to load the utility DLL. By way of example, assume that a plug-in DLL depends on a utility DLL to execute a particular COM object operation. Assume this COM object operation is called on the $5^{th}$ COM object to be created. If the utility DLL were implicitly linked with the plug-in DLL then both DLLs would need to be loaded and initialized before even the first COM object is created. Delay-loading the utility DLL helps because the first COM object can be created after loading and initializing only the plug-in DLL. However, the $5^{th}$ COM object operation will be held up while the utility DLL is loaded and initialized. By having the manager thread load the utility DLL, the first COM object can be created after waiting only for the plug-in DLL to be loaded and initialized. This involves reading from disk and direct memory transfers that don't require many CPU cycles. The main thread is then free to continue processing (creating, interacting with, and then destroying COM objects). By the time the $5^{th}$ COM object is created, the utility DLL will already be loaded.

The code which initiates, executes, and terminates the manager thread can be advantageously encapsulated in a global object class. When the first COM object is created, the global object creates the manager thread. A pointer to the global object is passed to the manager thread to enable the manager thread to interact with members of the global object. Since all interactions with members of the class occur through the global object, only one manager thread is ever created at one time. The global object can track active COM objects though COM object calls. The global object can readily use standard Windows synchronization mechanisms such as, for example, Windows Events, to signal the manager thread regarding various COM object events such as when the first COM object is created and when the last COM object is destroyed. In such a manner, the manager thread can know when there are no more COM objects. The global object can additionally load the plug-in DLL.

The manager thread resides in a loop in which it spends most of the rest of its lifetime. While in this loop, the manager thread yields while waiting for a particular event or a timeout to occur. When the manager thread finally exits the loop, the manager thread frees the DLL. The manager thread also cleans up various resources and terminates itself. This can be effectuated in the Windows architecture by a FreeLibraryAndExitThread API.

The manager thread's loop will be exited if the base driver DLL is unloaded from memory or if the timeout period elapses when no COM objects exists. The manager thread yields until either signaled by the main thread or the timeout period expires, whichever occurs first. The manager thread waiting for either an event or a timeout can be effectuated in the Windows architecture by a WaitForSingleObject API. The overall timeout period is tracked as the manager thread sleeps and awakes for the shorter period to check for the unloading of the base driver DLL from memory.

Appended hereto is pseudo code for implementing one embodiment of the present method. One skilled in this art would readily be able to implement the present method described herein in detail in a Windows environment using the code appended hereto without undue experimentation. Other operating system environments running on differing architectures may require adaptations thereto. Such adaptations are to be considered as falling within the scope of the appended claims.

Figure 2:
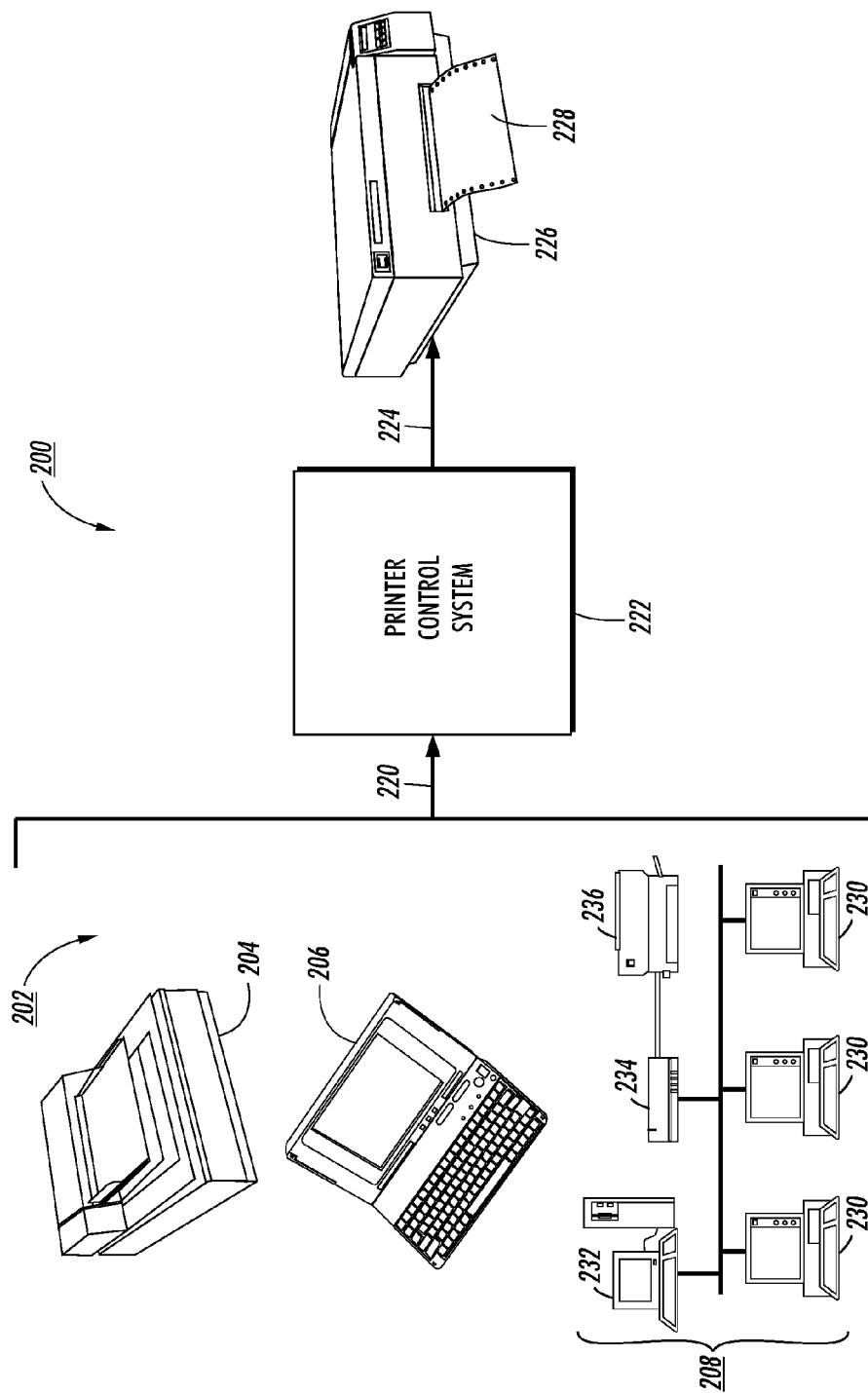
FIG. 2 illustrates an embodiment of a system known in the arts wherein various embodiments of the present method are likely to be incorporated.

Reference is now being made to FIG. 2 which illustrates an embodiment of a system known in the arts wherein various embodiments of the present method are likely to be incorporated.

Printing system 200 includes an imaging source, collectively at 202, that may include scanner 204, portable computing device 206, networked computer system 208, or any similar or equivalent device capable of generating or otherwise providing image data 220. The image data is supplied to printer control system 222 which processes the received image data 220 to produce print data 224 that drives image output device 226. The portable computing device 206 may include, for example, a laptop, camera, cell phone, a personal digital assistant (PDA) such as a Blackberry, or any other device capable of generating image data 220. The networked system 208 is shown generally comprising a plurality of terminals 230, server 232, data storage 234, and document reproduction device 236, all in wired and/or wireless communication, capable of individually or collectively providing image data 220. The image data may be any combination of ASCII data, bitmapped image, scanned image data, pixel image data, geometric data, graphics primitives, page description language, etc.

Image processing control system 222 may comprise what is commonly referred to in the art as a print driver, including one or more plug-ins, and may also comprise a digital front end, user interface, operating system, or other software and/or hardware constructs known in the arts for driving marking device 226. Marking device 26 may comprise any one of a number of printing devices including, but not limited to, electrostatographic printers (e.g., laser, electro-photographic, ionographic), liquid ink printers (e.g., drop-on-demand; phase change wax-based; piezoelectric, acoustic, or thermal inkjet), etc. Those skilled in the art will recognize that the printer control system may be implemented in hardware and/or software and may reside within printer 226. Generally, in response to print data 224, which may comprise image data and/or printer control signals (e.g., paper handling, finishing options, carriage control, ink deposition), marking device 226 generates an output image on a suitable image reproduction medium (e.g., print or display) such as, for example, paper 228.

Although one or more aspects of various embodiments discussed herein are generally useful as features or characteristics of image processing control system 222 which may be one or both of software or hardware construct, the embodiments hereof are not to be viewed as limited to any single component of the printing system. Further, the teachings hereof are not limited in there application to copying and printing machines and may be incorporated in other output devices such as electronic display systems including CRTs, LCDs, LED, etc.

Figure 3:
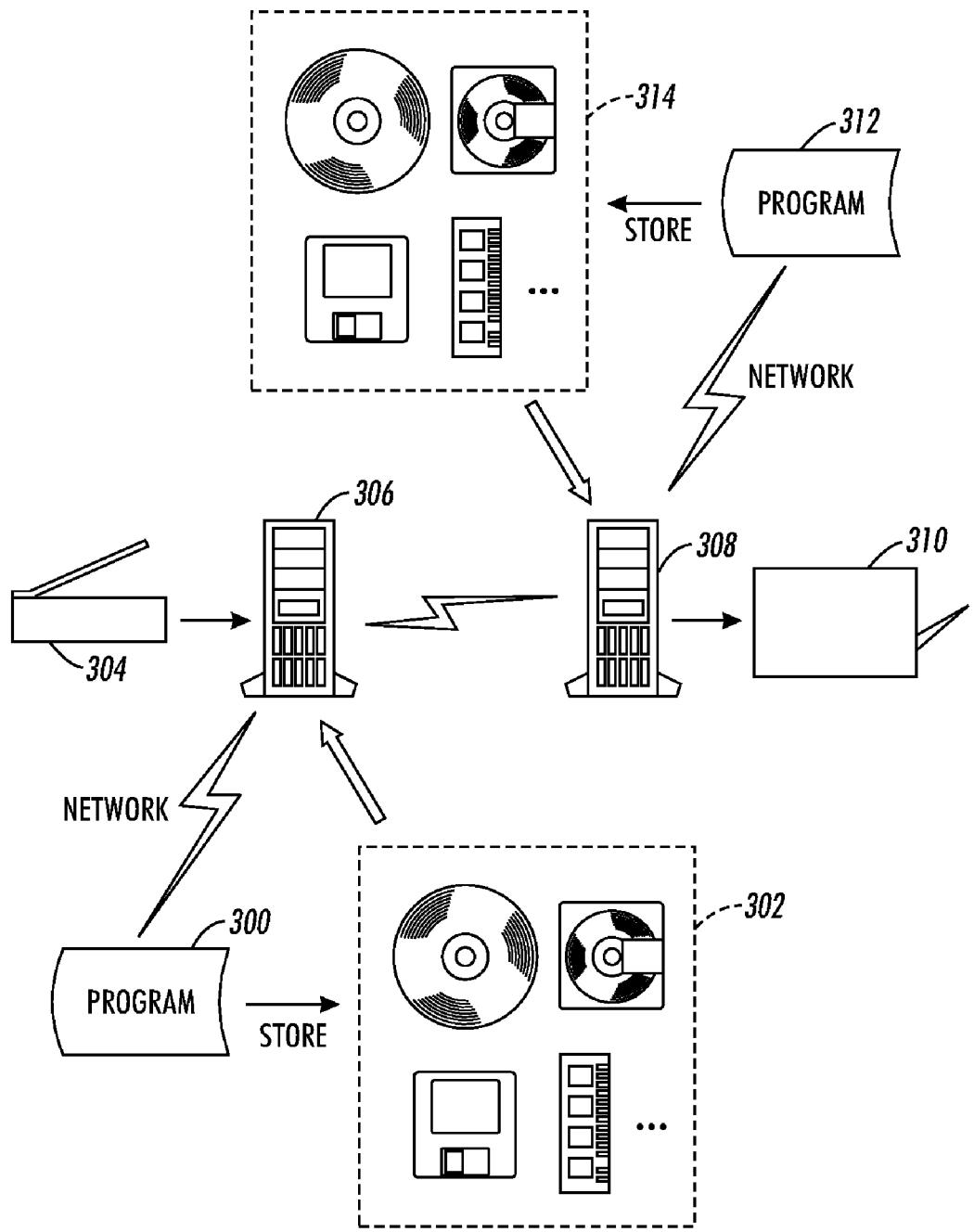
FIG. 3 is an explanatory diagram for explaining one prior art example of how a computer storage medium stores various embodiments of the present method such that these embodiments can be executed by a computer system interfacing with an imaging source and an image output device.

Reference is now being made to FIG. 3 which is an explanatory diagram for explaining one example of a computer storage medium storing various embodiments of the present method for such that these embodiments can realized by a computer operating system.

Machine readable program code 300 contains instructions that, when mounted on computer system 306, cause the computer to perform the steps of the present method. One or more computer program instructions for carrying out the present method are loaded on computer-readable storage media 302 which includes media such as optical disks (CD-ROM etc.), magnetic disks, magnetic cards, memories (including IC cards and memory card). The storage media stores the machine readable program instructions for sale, transport, and storage by changing magnetic, optical, and/or electric energy states in response to program description instructions having been transferred to the media. The storage medium can then be mounted on computer system 306 to execute one or more steps of the present method on the image data (220 of FIG. 2) received from imaging source 304. Imaging source 304 is analogous to imaging source 202 of FIG. 2. Computer systems 306 and 308 are analogous to one or more of the networked devices 208 of FIG. 2. Computer system 308 communicates with image output unit 310. Image output unit 310 is analogous to image output device 226 of FIG. 2. One or both of the computer systems 306 and 308 are capable of executing the steps for minimizing loading and unloading of plug-in DLLs in a user-initiated print operation environment. The program instructions containing the present method can then be off-loaded to another program 312, in original form or modified, including data, and stored on storage media 314.

One or both of the computer systems 304 and 306 includes processors capable of executing machine executable program instructions. Each of the processor is in communication with a bus (e.g., a backplane interface bus, cross-over bar, or data network). The processes read the machine instructions from the storage media and execute the instructions to perform one or more steps of the present method.

These computer systems also include a main memory capable of storing machine readable instructions including system programming functionality ancillary to or necessary for the execution of one or more steps of the present method. The main memory is also capable of storing data used by or produced by the processor. The main memory may alternatively include random access memory (RAM) to support reprogramming and flexible data storage. The main memory typically includes a buffer to temporarily store data for access by the processor and a program memory that may include executable programs required to implement the steps of the methods described herein. The program memory is further capable of storing a subset of the data contained in the buffer.

The computer system may also include a secondary memory. The secondary memory may include, for example, a hard disk drive and/or a removable storage drive which reads and writes to removable storage unit, such as a floppy disk, magnetic tape, optical disk, etc., that stores computer software and/or data. The secondary memory may further include other similar mechanisms for allowing computer programs or other machine readable instructions to be loaded into the computer system. Such mechanisms may include, for example, a removable storage unit adapted to exchange data through an interface. Examples of such mechanisms include a program cartridge and cartridge interface (such as that found in video game devices), a removable memory chip (such as an EPROM, or PROM) and associated socket, and other removable storage units and interface devices which allow software and data to be transferred from the removable storage unit to the computer system. One or both of the computer systems typically will include an interface that forwards data from a communication bus or from a frame buffer to a display device. The computer system may further include a communications interface which acts as both an input and an output to allow software and data to be transferred between the computer system and one or more external devices. Examples of a communications interface include a modem, a network interface (such as an Ethernet card), a communications port, a PCMCIA slot and card, etc.

Software and data transferred via the communications interface are in the form of signals which may be, for example, electronic, electro-magnetic, optical, or other signals capable of being transmitted/received by a communications interface. These signals are provided via a communications path (i.e., a channel) which carries such signals and may be implemented using wire, cable, fiber optic, phone line, cellular link, RF, or other communications channels.

Terms such as, computer program medium, computer executable medium, computer usable medium, and computer readable medium, are used herein to generally refer to media such as main memory and secondary memory, removable storage drives, a disk installed in a hard drive, and other signals. These computer program products are means for providing instructions and/or data to the computer system. The computer readable medium stores data, instructions, messages packets, or other machine readable information. The computer readable medium, for example, may include non-volatile memory, such as a floppy, ROM, flash memory, disk memory, CD-ROM, and other permanent storage useful, for example, for transporting information, such as data and computer instructions.

Furthermore, the computer readable medium may comprise computer readable information in a transitory state medium such as a network link and/or a network interface, including a wired network or a wireless network, which allows a computer to read such computer readable information. Computer programs (also called computer control logic) may be stored in main memory and/or secondary memory. Computer programs may also be received via a communications interface. Such computer programs, when executed, enable the computer system to perform the features and capabilities provided herein.

It should also be understood that the method described in the flowcharts provided herewith can be implemented on a special purpose computer, a microprocessor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions.

It should be understood that the flow diagrams depicted herein are illustrative. Other operations, for example, may be added, modified, enhanced, condensed, integrated, or consolidated. Variations thereof are envisioned and are intended to fall within the scope of the appended claims. Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

It should also be understood that the teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a printer, a photocopier, a driver, a scanner, a photographic system, a xerographic device, or the like. The methods provided herein can also be implemented by physical incorporation into an image processing, image reproduction, or color management system.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described herein. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

What is claimed is:

1. A method for minimizing repeat instantiation of plug-in DLLs (Dynamically Linked Libraries) during the course of a single user-initiated operation, the method comprising:
   initiating, by a user, an operation which requires a base driver process;
   instantiating said base driver process in response to said user-initiated operation;
   creating a global object responsible for tracking active COM (Component Object Model) objects;
   loading, by any of said base driver and said global object, a plug-in DLL into memory;
   in response said plug-in DLL constructing a first COM object, said global object creating a manager thread responsible for said plug-in DLL and providing said manager thread with a pointer to said global object, said pointer enabling said global object to interact with said manager thread about active COM objects being tracked by said global object;
   in response to the creation of said manager thread, incrementing a system reference count associated with said plug-in DLL, said reference count indicating that another component in the process is using said plug-in DLL and ensuring that said plug-in DLL remains loaded in said memory between repeated base driver calls for the entire duration of said user-initiated operation;
   tracking, by said global object, COM objects constructed by said plug-in DLL; and
   freeing said plug-in DLL in response to no COM objects being found active after a predetermined amount of time.

2. The method of claim 1, wherein in advance of said global object creating said manager thread, further comprising determining the existence of said manager thread and creating said manager thread only if said manager thread does not exist.

3. The method of claim 1, further comprising:
   checking if said base driver is still loaded in said memory; and
   terminating said manager thread in response to said base driver being no longer loaded in said memory.

4. The method of claim 1, further comprising loading a utility DLL to prepare resources needed by COM object operations created later in a sequence of said COM object creations.

5. A system for minimizing repeat instantiation of plug-in DLLs (Dynamically Linked Libraries) during the course of a single user-initiated operation, the system comprising:
   a storage medium capable of storing data; and
   a processor in communication with said storage medium, said processor capable of executing a machine readable instruction for performing the method of:
      initiating, by a user, an operation which requires a base driver process;
      instantiating said base driver process in response to said user-initiated operation;
      creating a global object responsible for tracking active COM (Component Object Model) objects;
      loading, by any of said base driver and said global object, a plug-in DLL into memory;
      in response said plug-in DLL constructing a first COM object, said global object creating a manager thread responsible for said plug-in DLL and providing said manager thread with a pointer to said global object, said pointer enabling said global object to interact with said manager thread about active COM objects being tracked by said global object;
      in response to the creation of said manager thread, incrementing a system reference count associated with said plug-in DLL, said reference count indicating that another component in the process is using said plug-in DLL and ensuring that said plug-in DLL remains loaded in said memory between repeated base driver calls for the entire duration of said user-initiated operation;
      tracking, by said global object, COM objects constructed by said plug-in DLL; and
      freeing said plug-in DLL in response to no COM objects being found active after a predetermined amount of time.

6. The system of claim 5, wherein in advance of said global object creating said manager thread, further comprising determining the existence of said manager thread and creating said manager thread only if said manager thread does not exist.

7. The system of claim 5, further comprising:
   checking if said base driver is still loaded in said memory; and
   terminating said manager thread in response to said base driver being no longer loaded in said memory.

8. The system of claim 5, further comprising loading a utility DLL to prepare resources needed by COM object operations created later in a sequence of said COM object creations.

9. A computer program product for minimizing repeat instantiation of plug-in DLLs (Dynamically Linked Libraries) during the course of a single user-initiated operation, the computer program product comprising:
- a non-transitory computer readable medium for storing instructions that, when executed on a computer, cause the computer to perform a method comprising:
  - initiating, by a user, an operation which requires a base driver process;
  - instantiating said base driver process in response to said user-initiated operation;
  - creating a global object responsible for tracking active COM (Component Object Model) objects;
  - loading, by any of said base driver and said global object, a plug-in DLL into memory;
  - in response said plug-in DLL constructing a first COM object, said global object creating a manager thread responsible for said plug-in DLL and providing said manager thread with a pointer to said global object, said pointer enabling said global object to interact with said manager thread about active COM objects being tracked by said global object;
  - in response to the creation of said manager thread, incrementing a system reference count associated with said plug-in DLL, said reference count indicating that another component in the process is using said plug-in DLL and ensuring that said plug-in DLL remains loaded in said memory between repeated base driver calls for the entire duration of said user-initiated operation;
  - tracking, by said global object, COM objects constructed by said plug-in DLL; and
  - freeing said plug-in DLL in response to no COM objects being found active after a predetermined amount of time.

10. The computer program product of claim 9, wherein in advance of said global object creating said manager thread, further comprising determining the existence of said manager thread and creating said manager thread only if said manager thread does not exist.

11. The computer program product of claim 9, further comprising:
- checking if said base driver is still loaded in said memory; and
- terminating said manager thread in response to said base driver being no longer loaded in said memory.

12. The computer program product of claim 9, further comprising loading a utility DLL to prepare resources needed by COM object operations created later in a sequence of said COM object creations.

* * * * *